(12) United States Patent
Johnson et al.

(10) Patent No.: US 8,027,932 B2
(45) Date of Patent: Sep. 27, 2011

(54) SYSTEMS AND METHODS FOR MODIFICATION OF SERVICE STATUS OF GEOGRAPHICAL DELIVERY AREAS FOR COMMON CARRIERS

(75) Inventors: Jerry M. Johnson, Carnation, WA (US); Lynn Shaindell Goldhaber, Bellevue, WA (US); John McNiel Dietz, Newcastle, WA (US); William Ward Smith, III, Medina, WA (US); Jinyue Liu, Sammamish, WA (US); Hsiangwen S Hu, Sammamish, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 172 days.

(21) Appl. No.: 12/333,476

(22) Filed: Dec. 12, 2008

(65) Prior Publication Data
US 2010/0153148 A1    Jun. 17, 2010

(51) Int. Cl.
*G06Q 10/00* (2006.01)
(52) U.S. Cl. ........................................ 705/334; 705/330
(58) Field of Classification Search .................. 705/334, 705/330
See application file for complete search history.

(56) References Cited

U.S. PATENT DOCUMENTS

| | | | |
|---|---|---|---|
| 6,842,774 B1* | 1/2005 | Piccioni | 709/207 |
| 6,976,007 B1 | 12/2005 | Boucher et al. | |
| 2002/0032573 A1* | 3/2002 | Williams et al. | 705/1 |
| 2005/0278773 A1* | 12/2005 | DeCinque et al. | 725/138 |
| 2006/0000903 A1* | 1/2006 | Barry et al. | 235/385 |
| 2006/0293938 A1* | 12/2006 | Wittmann et al. | 705/8 |
| 2008/0133302 A1* | 6/2008 | Brauninger et al. | 705/8 |

OTHER PUBLICATIONS

Flightstats.com (retrieved Aug. 12, 2007, available at: http://web.archive.org/web/20070812200724/http://www.flightstats.com/go/Home/home.do).*
National Mail Service Updates, United States Postal http://www.usps.com/communications/news/serviceupdates.htm.
Hurricane Katrina, UPS, http//web.archive.org/web/20050924200755/www.ups.com/content/us/en/about/news/serviceupdates/Katrina.htm.
International Search Report and Written dated Nov. 20, 2009, Application No. PCT/US2009/058350.

* cited by examiner

*Primary Examiner* — John Hayes
*Assistant Examiner* — Kevin Flynn
(74) *Attorney, Agent, or Firm* — Alston & Bird, LLP

(57) ABSTRACT

Various embodiments of the present invention provide systems and methods for modifying the status for one or more carrier services based on one or more geographical delivery areas. Such embodiments provide an interface module executed by a processor to modify data indicating the status for the one or more carrier services in response to obtaining data indicating the one or more carrier services to be modified, a beginning date for which the status of the one or more carrier services is to be modified, an ending date for which the status will return to its pre-existing state prior to being modified, one or more geographical delivery areas in which the status is to be modified, and a modification for the one or more carrier services.

11 Claims, 11 Drawing Sheets

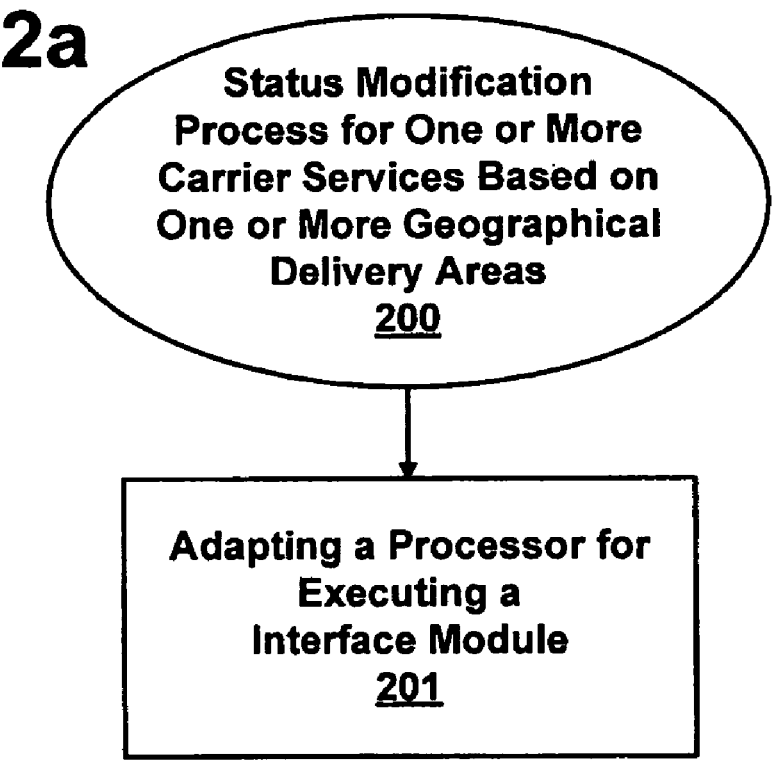
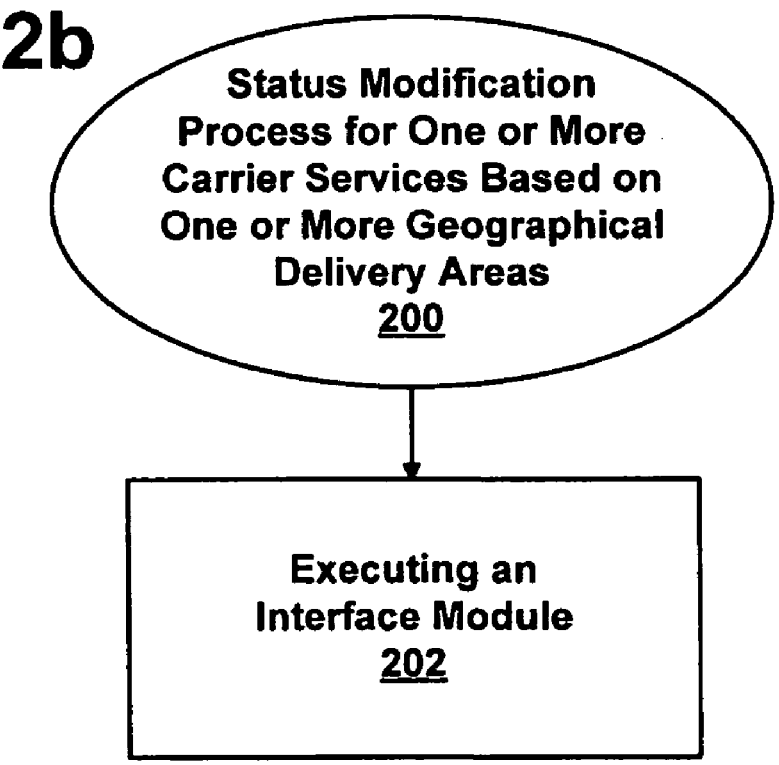

CARRIER SERVICE MODIFICATION SCREEN

Select Carrier Service to Modify

| | | | | | |
|---|---|---|---|---|---|
| Airborne Express | Special | Atlanta, GA | New Orleans, LA | 9/1/2007 | Delayed |
| DHL | Overnight Air | Atlanta, GA | New Orleans, LA | 3/15/2007 | Suspended |
| DHL | Three-day Ground | Atlanta, GA | Chicago, IL | OPEN | Normal |
| UPS | Express | New York, NY | Chicago, IL | OPEN | Terminated |
| UPS | Three-day Ground | Atlanta, GA | New Orleans, LA | OPEN | Normal |
| UPS | Three-day Ground | Atlanta, GA | Chicago, IL | OPEN | Normal |

Selected Carrier: ALL

Selected Service: ALL

From Location: ALL
- Atlanta, GA
- Chicago, IL
- New Orleans, LA
- New York, NY
- Richmond, VA To Location: New Orleans, LA Start Date: 9/1/2005

End Date: OPEN

Current Status: Suspended

Reason:

SAVE    CLOSE

FIG. 6C

CARRIER SERVICE MODIFICATION SCREEN

Select Carrier Service to Modify

| | | | | |
|---|---|---|---|---|
| Airborne Express | First Class | New Orleans, LA | New York, NY | OPEN | Normal |
| Airborne Express | Special | Atlanta, GA | New Orleans, LA | 5/6/2006 | Delayed |
| DHL | Overnight Air | Atlanta, GA | New Orleans, LA | 1/1/2007 | Suspended |
| DHL | Three-day Ground | Atlanta, GA | Chicago, IL | OPEN | Normal |
| UPS | Express | New York, NY | Chicago, IL | 1/1/2005 | Terminated |
| UPS | Three-day Ground | Atlanta, GA | Chicago, IL | OPEN | Normal |

Selected Carrier: UPS
Selected Service: Three-day Ground
From Location: Atlanta, GA
To Location: Chicago, IL Start Date: 4/1/2007
End Date: 11/9/2007

Current Status: NORMAL
- Delayed
- Embargoed
- Normal
- Suspended
- Terminated

Reason:

[SAVE] [CLOSE]

FIG. 6D

CARRIER SERVICE MODIFICATION SCREEN

Select Carrier Service to Modify

| Carrier | Service | From | To | Start | End | Status |
|---|---|---|---|---|---|---|
| Airborne Express | First Class | New Orleans, LA | New York, NY | OPEN | OPEN | Normal |
| Airborne Express | Special | Atlanta, GA | New Orleans, LA | 5/6/2006 | 9/1/2007 | Delayed |
| DHL | Overnight Air | Atlanta, GA | New Orleans, LA | 1/1/2007 | 3/15/2007 | Suspended |
| DHL | Three-day Ground | Atlanta, GA | Chicago, IL | OPEN | OPEN | Normal |
| UPS | Express | New York, NY | Chicago, IL | 1/1/2005 | OPEN | Terminated |
| UPS | Three-day Ground | Atlanta, GA | Chicago, IL | OPEN | OPEN | Normal |

Selected Carrier: UPS ▶

Selected Service: Three-day Ground ▶

From Location: Atlanta, GA ▶

To Location: Chicago, IL ▶

Start Date: 4/1/2007

End Date: 11/9/2007

Current Status: Delayed ▶

Reason: Flooding due to spring rain storms

[SAVE] [CLOSE]

FIG. 6E

SYSTEMS AND METHODS FOR MODIFICATION OF SERVICE STATUS OF GEOGRAPHICAL DELIVERY AREAS FOR COMMON CARRIERS

BACKGROUND OF THE INVENTION

1. Field of the Invention

The disclosed invention generally pertains to the field of common carriers, and more specifically, to a system and method for modifying the status of one or more carrier services based on one or more geographical delivery areas so that carrier service interruptions can thereby be presented to shippers to advise them of such interruptions.

2. Description of the Related Art

A common carrier is an organization that is entrusted with shipping an item for a fee. Such an item may be as small as a letter or a package, or may range to larger shipments such as freight or livestock. For example, individuals use UPS® shipping services to ship letters or packages throughout the world. In addition to individuals, many businesses use common carriers to fulfill their daily shipping needs, as well as to ship the products they manufacture to stores or distributors.

Responsive to shipper's needs, common carriers usually offer a variety of shipping options. For example, shipping services may be offered to various geographical locations with different modes of transportation (ground, air, or sea), or selected levels of service (next day, a week, three days, or over-night). Through provision of shipping options and features, common carriers are constantly competing to attract shippers by providing the best service for the shipper at the lowest price.

A tool used by many individuals and companies to help in selecting carrier service are multi-carrier shipping systems. Such systems usually provide an online web-based application that allows shippers to easily compare rates and services among multiple carriers. In addition, these systems may also provide integrated and detailed shipping information, as well as allow the shipper to pay for shipping and print package labels.

An example of such a system is shown in FIG. 1. The system is set up so that an organization's network can access the multi-carrier shipping system 100 via the Internet 101. Thus a shipper sitting at his or her desk can access the system 100 directly from a desktop computer 102 to ship a document to a customer or fellow employee in another office, for example. The shipper simply operates the computer 102 to launch a web browser and in turn brings up a webpage interface for the multi-carrier shipping system 100. The shipper enters information to indicate where the document is to be shipped, such as the address of the recipient, and the type of service he or she prefers, such as over-night air service. The system is queried and returns options from several common carriers systems 103-106 along with their prices for shipping the document under the criteria indicated by the shipper. The employee may then choose the option that best meets the shipper's needs or the shipper may adjust his or her requirements in order to see other shipping options and pricing. For example, if the cheapest it will cost to ship the document over-night by air is twenty-seven dollars and the shipper determines that is too high, the shipper may change his or her requirements to three-day ground delivery in order to reduce the shipping cost. In many cases, these alternatives are automatically provided by the system along with the price listing for the selected type of service.

Thus, in order to facilitate the operation of multi-carrier shipping systems, the carriers will provide shipping information to a service that furnishes the system so that the shipping options and pricing may be offered to the shipper. In some cases, the carriers may allow the multi-carrier shipping system to access the information on their systems. However, many times the carriers will prefer to provide the information to the service for security reasons.

A problem that is encountered by many carriers with providing shipping information to such systems is during times of emergency (e.g., hurricanes, floods, earthquakes, etc.) carriers may restrict shipments to specific geographical areas. Thus, service may be entirely suspended or guarantees for such services may be relaxed or suspended. Currently, in such cases, the carrier will contact the service providing the multi-carrier shipping system and the service will set up delivery service interruptions (e.g., type of interruption and area affected) for shippers manually by editing a database that contains the areas for delivery and the types of services available for each area. Many times, implementing such restrictions is time sensitive and manual procedures may prove to be too slow. Thus, a need exists in the art to allow such restrictions to be implemented in a more timely fashion.

BRIEF SUMMARY OF THE INVENTION

Various embodiments of the present invention provide systems and methods for modifying the status for one or more carrier services based on one or more geographical delivery areas so that carrier service interruptions can thereby be presented to shippers to advise them of such interruptions. In particular, various embodiments are directed to a method for providing an interface module to modify the status for the one or more carrier services. While other embodiments are directed to a method for executing an interface module stored in memory to modify the status for the one or more carrier services.

In various embodiments, the interface module is adapted for modifying data indicating the status for the one or more carrier services in response to: (a) obtaining data indicating one or more carrier services; (b) obtaining data indicating a beginning date for which the status is to be modified; (c) obtaining data indicating an ending date for which the status is to return to its pre-existing state prior to being modified; (d) obtaining data indicating the one or more geographical delivery areas in which the status is to be modified; and (e) obtaining data indicating a modification for the status. In various embodiments, the status includes normal, terminated, suspended, delayed, embargoed, or any combination thereof.

In addition, the interface module of various embodiments is adapted for transmitting data indicating the status to a carrier system for publishing to shippers. The interface module of various embodiments is also adapted for automatically modifying the data indicating the status to return the status on the ending date to its pre-existing state prior to being modified. Furthermore, the interface module of various embodiments is further adapted for modifying the data indicating the status in response to obtaining data indicating one or more carriers for which the status is to be modified. In other embodiments, the interface module is further adapted for modifying data indicating the status in response to obtaining data indicating a description for why the status is to be modified.

As another example, various embodiments of the invention provide a system for modifying a status for one or more carrier services based on one or more geographical delivery areas entails a processor adapted to execute an interface module and a memory coupled to the processor and adapted for storing the interface module. The processor executes the interface module to modify data indicating the status for one or more carrier services in response to: (a) obtaining data indicating one or more carrier services; (b) obtaining data indicating a beginning date for which the status is to be modified; (c) obtaining data indicating an ending date for which the status is to return to its pre-existing state prior to being modified; (d) obtaining data indicating the one or more geographical delivery areas in which the status is to be modified; and (e) obtaining data indicating a modification for the status. In addition, the processor executes the interface module to transmit the data indicating the status to a carrier system for publishing to shippers and to automatically modify the data indicating the status to return the status on the ending date to its pre-existing state prior to being modified.

Furthermore, various embodiments of the invention provide a computer-readable medium having a computer program for modifying a status for one or more carrier services based on one or more geographical delivery areas that is executable by a processor to modify data indicating the status for one or more carrier services in response to: (a) obtaining data indicating one or more carrier services; (b) obtaining data indicating a beginning date for which the status is to be modified; (c) obtaining data indicating an ending date for which the status is to return to its pre-existing state prior to being modified; (d) obtaining data indicating the one or more geographical delivery areas in which the status is to be modified; and (e) obtaining data indicating a modification for the status. In addition, the computer program is further executable by the processor to transmit the data indicating the status to a carrier system for publishing to shippers and to automatically modify the data indicating the status to return the status on the ending date to its pre-existing state prior to being modified.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2a is a flowchart illustrating a process to provide to modify the status for one or more carrier services based on one or more geographical delivery areas according to various embodiments of the invention.

FIG. 2b is a flowchart illustrating a process to modify the status for one or more carrier services based on one or more geographical delivery areas according to various embodiments of the invention.

FIG. 6A is a schematic of a Graphical User Interface (GUI) according to various embodiments of the invention.

FIG. 6B is an additional schematic of the GUI shown in FIG. 6A according to various embodiments of the invention.

FIG. 6C is an additional schematic of the GUI shown in FIG. 6A according to various embodiments of the invention.

FIG. 6D is an additional schematic of the GUI shown in FIG. 6A according to various embodiments of the invention.

FIG. 6E is an additional schematic of the GUI shown in FIG. 6A according to various embodiments of the invention.

DETAILED DESCRIPTION OF THE INVENTION

Figure 1:
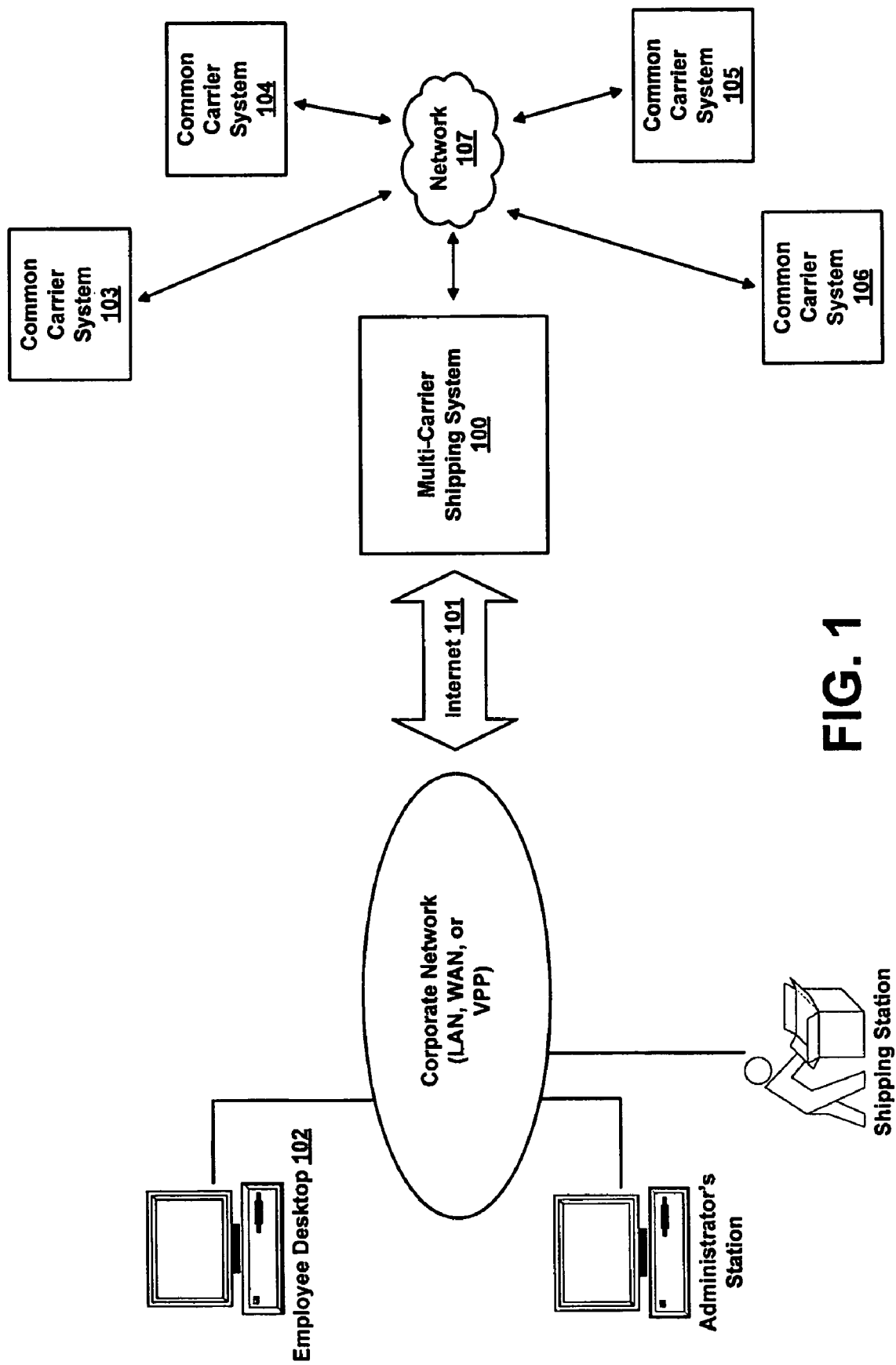
FIG. 1 is a schematic diagram illustrating a multi-carrier shipping system.

The present invention will now be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, DVD-ROMs, USB flash drives, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Modifying the Status for a Particular Carrier Service

Various embodiments of the present invention provide systems and methods for modifying the status for one or more carrier services based on one or more geographical delivery areas so that carrier service interruptions can thereby be presented to shippers to advise them of such interruptions. Such embodiments include providing an interface module that is executed on a computer to modify the status for the one or more carrier services. The computer executing the module modifies the status in response to: (1) obtaining data indicating one or more carrier services to be modified from a user; (2) obtaining data indicating a beginning date for which the status of the one or more carrier services is to be modified; (3) obtaining data indicating an ending date for which the status will return to its pre-existing state prior to being modified (4) obtaining data indicating one or more geographical delivery areas in which the status is to be modified; and (5) obtaining data indicating a modification for the one or more carrier services. In addition, the interface module of various embodiments is further adapted for transmitting the data indicating the modified status to a carrier system and automatically returning the status for the one or more carrier services on the specified ending date to its pre-existing state prior to being modified.

FIGS. 2a and 2b are exemplary status modification processes for modifying one or more carrier services based on one or more geographical delivery areas 200 according to various embodiments of the invention. For instance, in various embodiments, a multi-carrier shipping system may be provided via a service to a number of shippers, e.g., individual consumers and businesses, to enable the shipper to solicit shipping services from a plurality of common carriers simultaneously from one integrated source. In many cases, such systems are web-based wherein the shipper logs onto the system over the Internet using the shipper's web browser on his or her personal computer and calls up a webpage, e.g., the home page for the multi-carrier shipping system.

Thus, the plurality of common carriers provide the service that furnishes the multi-carrier shipping system with shipping information such as the delivery services the carriers offer to various geographical areas and the cost for such services. For instance, in various embodiments a carrier, such as United Parcel Services (UPS), will provide shipping information to the service that indicates that UPS offers shipping of packages via ground and air from Atlanta, Ga. to Chicago, Ill. In addition, the shipping information of various embodiments may also include the particular types of service the carrier provides for the various delivery services offered. For instance, in addition to providing information to inform shippers that UPS offers shipping via ground and air from Atlanta to Chicago, the information may also indicate that UPS provides over-night delivery service, three-day ground delivery service, and next day air delivery service from Atlanta to Chicago. Lastly, the shipping information of various embodiments may include the cost of shipping for the various services provided by the carrier. In many cases, the cost will be broken down based on the dimensions of the package, e.g., size and weight of the package, the shipping distance, e.g., Atlanta to Chicago, and particular type of service used to ship the package, e.g., over-night delivery.

As previously discussed, a problem that is encountered by many carriers with providing shipping information to such systems is during times of emergency (e.g., hurricanes, floods, earthquakes, etc.); carriers may restrict shipments to specific geographical areas. These geographical areas can be defined in various ways. For instance, the geographical areas are defined based on zip code in various embodiments. In other embodiments, the geographical areas are defined based on the region of the country, such as Southeast or Midwest. In other embodiments, the geographical areas are based on city, state, or country. Thus, service may be entirely suspended or guarantees for such services may be relaxed or suspended. For example, during the Katrina disaster, many carriers suspended all shipping services to the New Orleans area for months while the city was working to remediate the effects of the flooding. In time the carriers slowly began to reinstate service to the area, but in many cases, on a limited basis. For example, after a certain time period, a carrier may have reinstated ground service to the area but would not guarantee a three-day delivery for such service.

Time and again, a carrier will contact the service providing the multi-carrier shipping system in such cases of emergency, and the service will set up delivery service interruptions (e.g., type of interruption and area affected) for shippers manually by editing a database that contains the areas for delivery and the types of services available for each area. Many times implementing such restrictions is time sensitive and manual procedures prove to be too slow. Therefore, a solution to this problem is to provide a mechanism that allows the service or common carrier to implement delivery service interruptions more quickly.

Thus, the exemplary status modification process 200 according to various embodiments of the invention includes the step of adapting a processor for executing an interface module stored in memory. The process executes this interface module to modify the status for one or more carrier services, shown as Step 201 in FIG. 2a. In addition, the exemplary status modification process 200 according to other embodiments of the invention includes the step of executing an interface module stored in memory. The processor executes the interface module to modify the status for one or more carrier services upon execution, shown as Step 202 in FIG. 2b.

According to various embodiments, the processor, as it executes the interface module, modifies data indicating the status for the one or more carrier services in response to obtaining certain information. Thus, the processor in executing the module generates a Graphical User Interface (GUI) to obtain the information. This information may include, for example, the one or more carrier services to be modified. In one embodiment, the processor obtains data indicating the one or more carrier services to be modified by a user (e.g., the service providing the multi-carrier shipping system or a common carrier) simply typing in the one or more carrier services on the GUI. In another embodiment, the processor obtains data indicating the one or more carrier services to be modified by the shipper selecting the one or more carrier services from drop down lists provided on the GUI. In other embodiments, the carriers and services may be separate entries or drop down lists on the GUI so that the user is able to select a specific service for one or more carriers at one time or select one or more services for a selected carrier at one time.

In various embodiments, the information also includes a beginning date for which a status for one or more carrier services is to be modified. Thus, the processor obtains data indicating the beginning date for which the status for the one or more services will be modified by the user entering the beginning date into the GUI. As previously mentioned, the user may be the service that provides the multi-carrier shipping system in various embodiments or a common carrier in other embodiments. In addition, according to various embodiments, the information also includes an ending date for which the status for the one or more carrier services is to return to its pre-existing state prior to being modified. Again, the processor obtains data indicating the ending date by the user entering the ending date into the GUI.

In various embodiments, additional information includes one or more geographical delivery areas in which the status for the one or more carrier services is to be modified. For instance, a carrier may choose to restrict shipping services to particular areas based on zip code. For example, many carriers suspended service to the New Orleans zip code areas 70124 to 70129 after Hurricane Katrina. In other embodiments, the geographical delivery areas may be defined based on various other divisions such as city, state, region of the country, or country itself. It should be apparent to one of ordinary skill in the art that the geographical delivery areas can be defined numerous ways in light of this disclosure.

Furthermore, the information may include the modification to be instituted to the one or more carrier services according to various embodiments. The modification can encompass many different types of status. For instance, the one or more carrier services may be terminated, suspended, delayed, or embargoed. Thus, continuing with our example, a common carrier may have specified to suspend all ground shipping services to the New Orleans areas covered by zip codes 70124 to 70129 from Sep. 1, 2005 to Dec. 31, 2005 immediately following Hurricane Katrina. At that time, the carrier enters the information into the GUI and the processor obtains data indicating the information and, in response, modifies data indicating the status and transmits the data to the multi-carrier shipping system to reflect the modified status of the particular shipping services for the specified zip codes.

The processor via the interface module may modify the status in numerous ways according to various embodiments. For instance, in one embodiment, the shipping information is stored in one or more databases associated with the multi-carrier shipping system and the processor creates or updates various records in the database to reflect the modification. In another embodiment, the shipping information is stored in a file associated with the multi-carrier shipping system and the processor updates the file to reflect the modification. One of ordinary skill can envision various embodiments and various ways the processor can add, store, and edit shipping information in such systems in light of this disclosure. Thus, the processor modifies data associated with the one or more shipping services to reflect the changed status and transmits the data to the multi-carrier shipping system of various embodiments. Therefore, in our example, the multi-carrier shipping system will indicate that ground services to the area covered by zip code 70125 have been suspended until Dec. 31, 2005 if a shipper using the system enters shipping information indicating that he or she would like to ship a package to a New Orleans address that corresponds to this zip code.

In various embodiments, the processor may also obtain data via the interface module on one or more carriers for which the status for the one or more carrier services is to be modified. As a result, the processor will modify one or more carrier services for the one or more carriers while leaving the status of the services the same for the remaining carriers. In addition, the processor may also obtain data indicating a description for why the status for the one or more services has been modified according to various embodiments.

Furthermore, in various embodiments of the invention, the processor executes the interface module of the process 200 to modify data indicating that status to automatically return the status for the one or more modified services on the specified ending date to their pre-existing state prior to being modified. Various embodiments of the processor executing the module may accomplish this in numerous ways. For example, in one embodiment, the processor executes a batching feature of the module that periodically checks the ending dates stored in the database and deletes any records associated with an expired ending date. Therefore, as a result in the above-discussed example, the multi-carrier system will no longer indicate that ground services are suspended for the zip codes 70124 to 70129 after Dec. 31, 2005. This capability of having the status for the one or more carrier services automatically return to their pre-existing state provides the advantage of the services being more quickly restored.

Architecture of Multi-Carrier Shipping System

Figure 3:
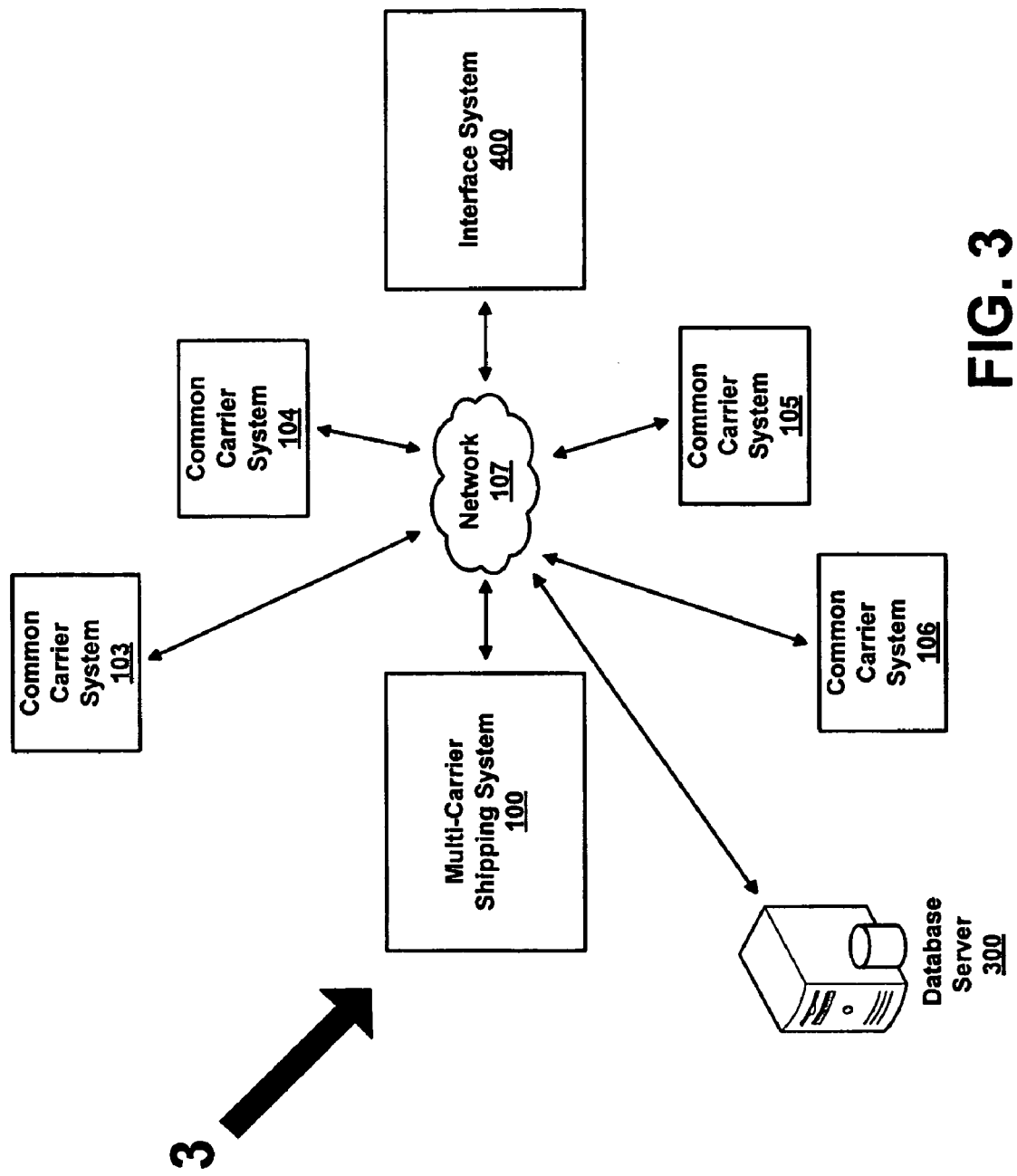
FIG. 3 is a schematic diagram illustrating a multi-carrier shipping system, an interface system, and a database server according to various embodiments of the invention.

A system architecture 3 according to various embodiments of the invention is shown in FIG. 3. As may be understood from this figure, in various embodiments, the system includes a multi-carrier shipping system 100, an interface system 400, a database server 300, and one or more common carrier systems 103-106 that are connected via a network 107 (e.g., a LAN, the Internet, and/or a private network) to communicate with one another. In one embodiment of the invention, the interface system 400 is configured for retrieving data from, and storing data to, a database located on the database server 300 (or, alternatively, located on the multi-carrier shipping system 100). In alternative embodiments, the system architecture 3 may include more than one database. In other embodiments, the interface system 400 may be one or more computers or software programs running on one or more computers.

Figure 4:
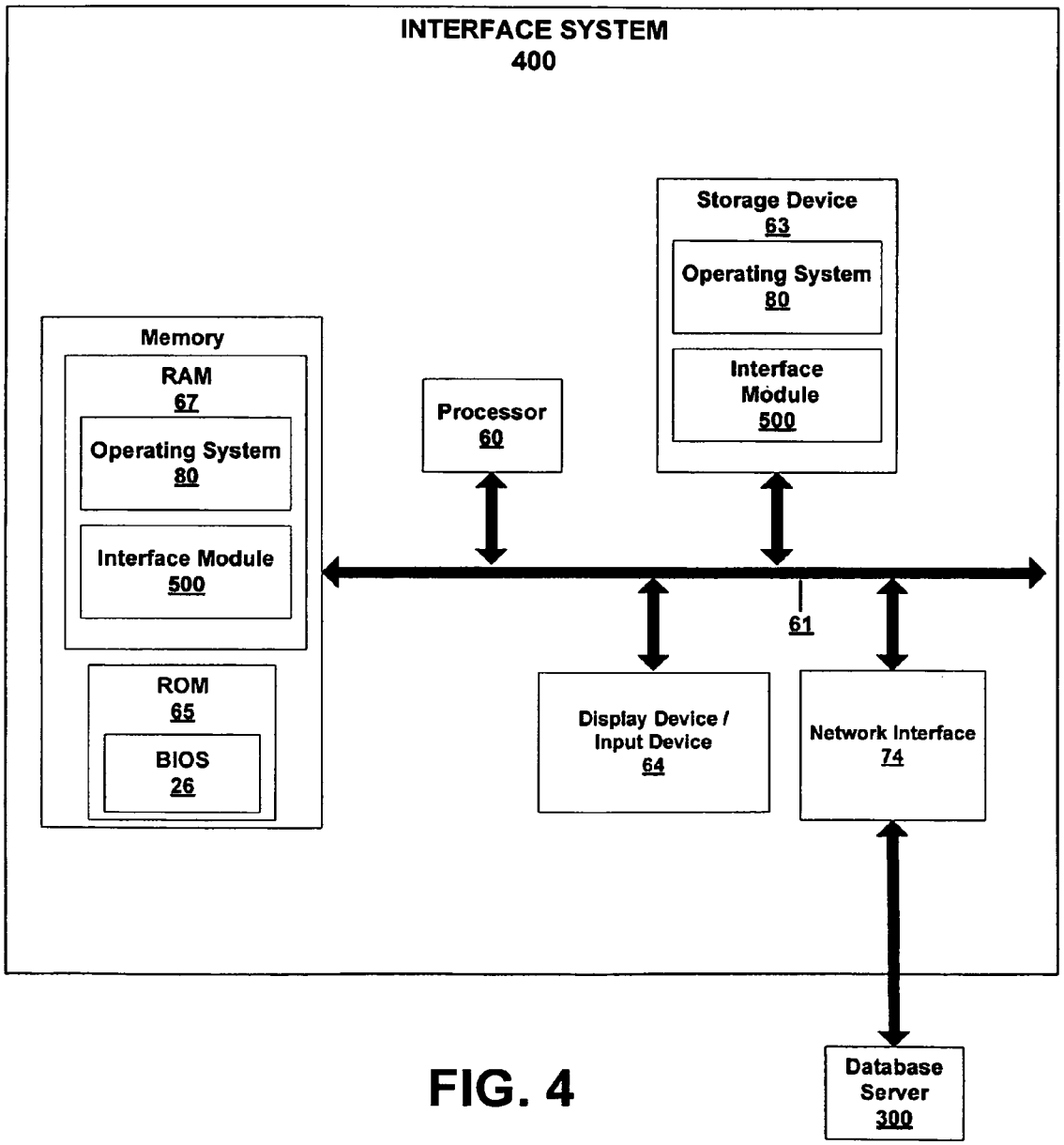
FIG. 4 is a schematic diagram illustrating a system running an interface module according to various embodiments of the invention.

FIG. 4 shows a schematic diagram of an interface system 400 running an interface module 500 to communicate with a database server 300 according to one embodiment of the invention. The interface system 400 includes a processor 60 that communicates with other elements within the computer system via a system interface or bus 61. Also included in the system 400 is a display device/input device 64 for receiving and displaying data. This display device/input device 64 may be, for example, a keyboard or pointing device that is used in combination with a monitor. The system 400 further includes memory, which includes both read only memory (ROM) 65 and random access memory (RAM) 67. The system's ROM 65 is used to store a basic input/output system 26 (BIOS), containing the basic routines that help to transfer information between elements within the system 400. Alternatively, the system 400 can operate on one computer or on multiple computers that are networked together.

In addition, the system 400 includes at least one storage device 63, such as a hard disk drive, a floppy disk drive, a CD ROM drive, a DVD ROM drive, a USB flash drive, or optical disk drive, for storing information on various computer-readable media, such as a hard disk, a removable magnetic disk, a CD-ROM disk, or a DVD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, memory sticks, compact discs, digital video disks, and Bernoulli cartridges.

A number of program modules may be stored by the various storage devices and within RAM 67. For example, as shown in FIG. 4, program modules of the system 400 include an operating system 80 and an interface module 500. The interface module 500 controls certain aspects of the operation of the system 95, as is described in more detail below, with the assistance of the processor 60 and an operating system 80.

Also located within the system 400 is a network interface 74, for interfacing and communicating via a network (e.g., Internet or private network). It will be appreciated by one of ordinary skill in the art that one or more of the system's components 400 may be located geographically remotely from other system components. Furthermore, one or more of the components may be combined, and additional components performing functions described herein may be included in the system 400.

Exemplary System Operation

As mentioned above, the system architecture 3 according to various embodiments enables communication between the multi-carrier shipping system 100, the interface system 400, the common carrier systems 103-106, and the database server 300. In particular, in various embodiments, the interface system 400 includes an interface module 500. The interface module 500 may be configured to communicate information between one or more common carriers 103-106, a database server 300, and the multi-carrier shipping system 100. This module 500 is discussed in more detail below.

Interface Module

Figure 5:
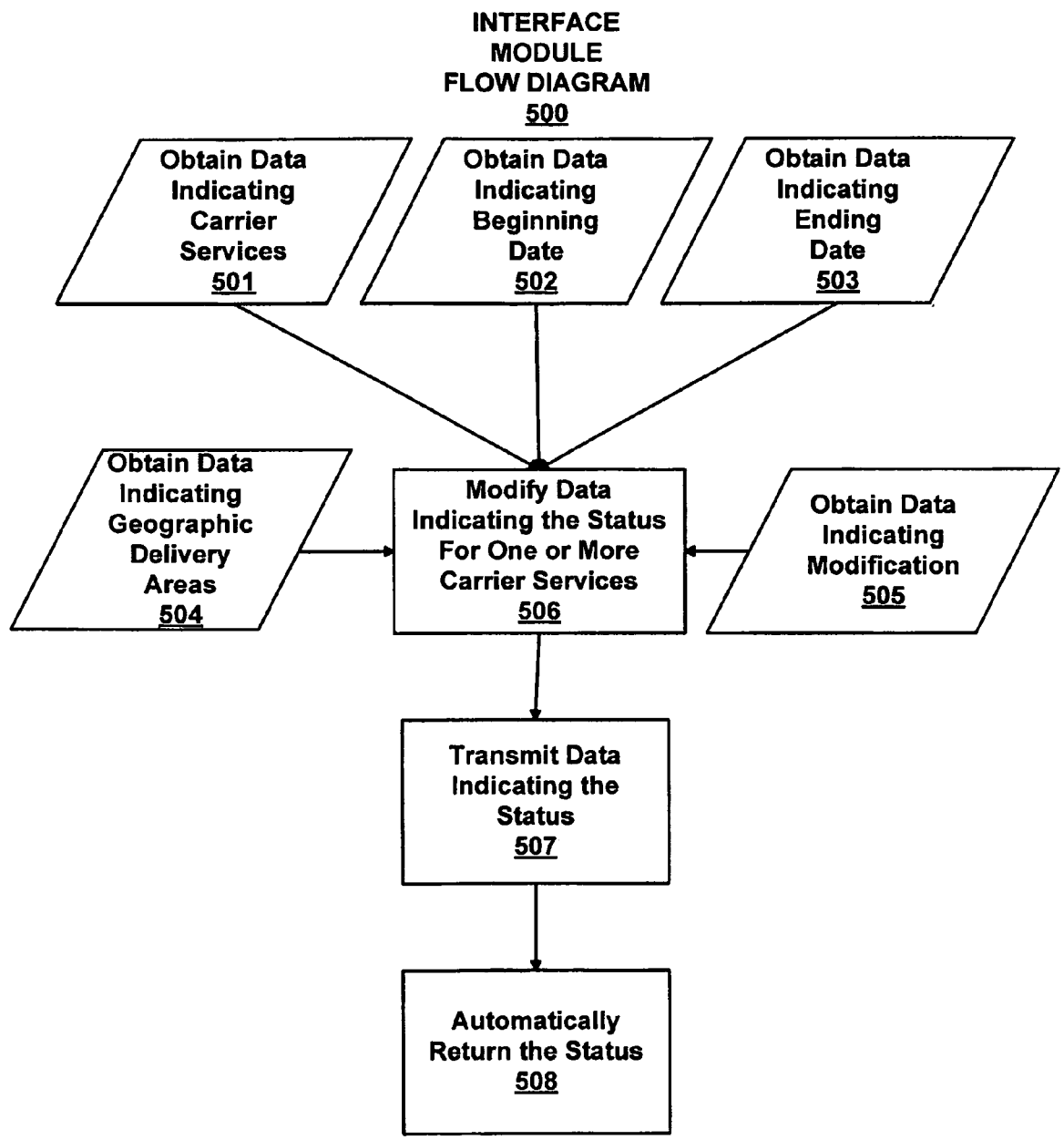
FIG. 5 is a flow diagram of an interface module according to various embodiments of the invention.

FIG. 5 illustrates a flow diagram related to an interface module 500 according to various embodiments of the invention. This flow diagram may correspond to the steps carried out by a processor 60 in the system 400 shown in FIG. 4 as it executes the interface module 500 in the RAM memory 67 of the system 400. In various embodiments, the interface module 500 may simply provide a webpage that is accessed through a user's Internet browser. In other embodiments, the interface module 500 may provide a graphical user interface (GUI) that is accessed over a network 107 by a shipper.

In various embodiments, the processor 60 executing the interface module 500 may obtain information from one or more common carrier systems 103-106 (e.g., one or more shippers) and a database server 300, as discussed above. The term "obtain" is used to mean receive or access the information. This can be accomplished either locally or remotely and may be via a communications network 107 (e.g., a LAN, the Internet, or private network).

Therefore, in various embodiments of the invention, the processor 60 executes the interface module 500 to obtain data indicating one or more carrier services from a user in order for their status to be modified as shown in Step 501. For example, the interface module 500 may provide a GUI that displays an initial listing of the various carriers along with the services each carrier provides, the locations for which the service is provided, and the status of the service as shown in FIG. 6A.

This initial listing of information may be provided from a computer memory. In various embodiments, the memory may hold a database in which the information is stored. This database may be located on a database server 300 in communication with a multi-carrier shipping system 100 and an interface system 400 over a network 107, as shown in FIG. 3. In other embodiments, the database may be located locally on the multi-carrier shipping system 100, or located on multiple servers in communication over the network 107.

In addition, other embodiments may store the information in various other ways. For example, the information may be stored in a library composed of a directory architecture that provides a number of directories and the information is stored as files in the directories within the directory architecture. The directory architecture may be set up based on a hierarchy so that files may be easily located. One of ordinary skill in the art can envision several different approaches to storing the information in memory in light of this disclosure.

Figure 7:
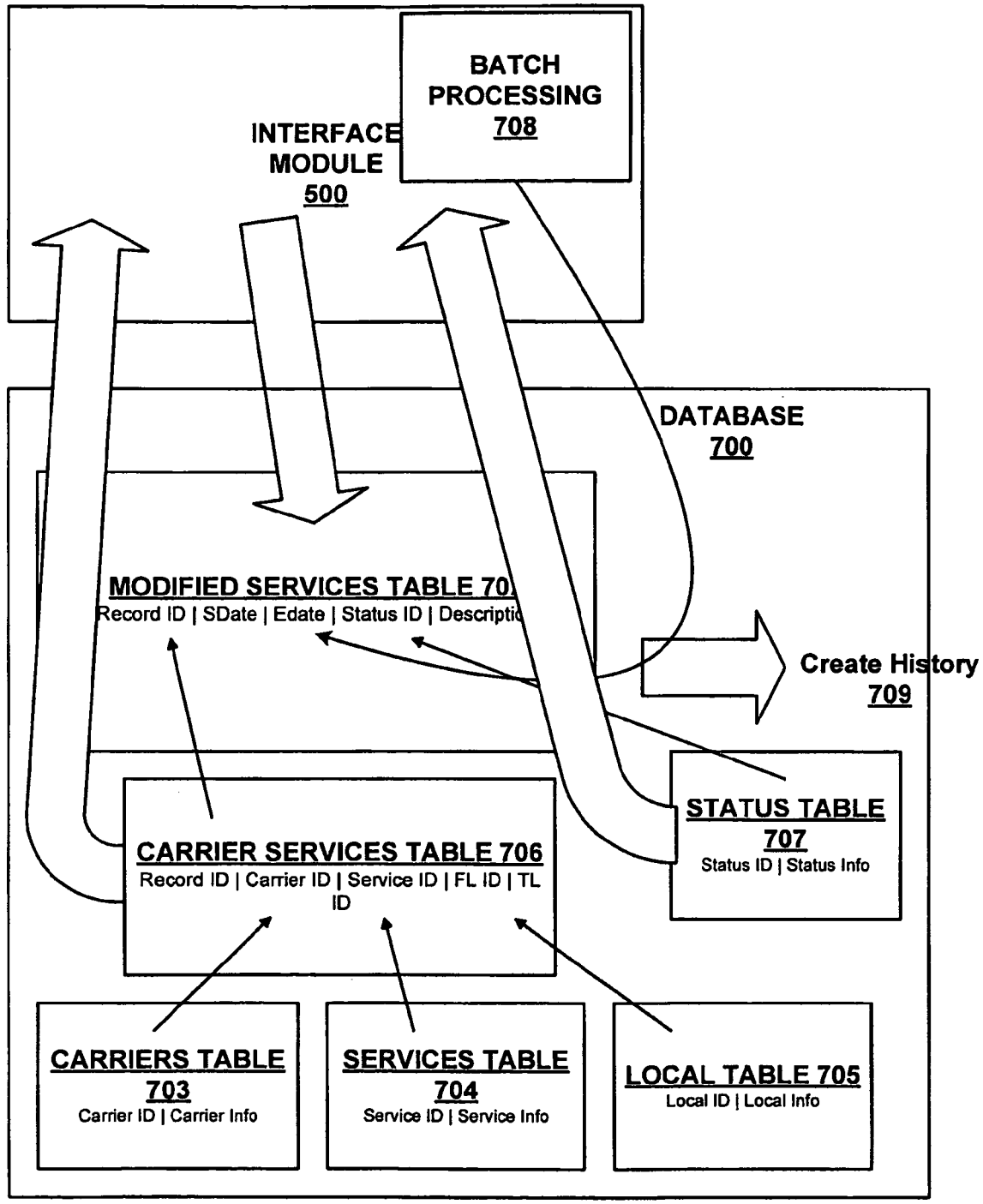
FIG. 7 is a schematic diagram illustrating database architecture according to various embodiments of the invention.

In the embodiments using a database located on a data storage device (e.g., database server 300), the database may be any one of a number of common types of databases as known in the art, such as Oracle (registered trademark of Oracle International Corporation, Redwood, Calif.) or Microsoft SQL Server (registered trademark of Microsoft Corporation, Redmond, Wash.). In addition, the database structure may be made up of a number of tables and the database may be managed via a database management system. For example, various tables are depicted in FIG. 7 for a database 700 according to various embodiments. However, it should be understood that the tables shown in FIG. 7 may not be the only tables that make up the database 700. The database 700 may include additional tables such as, for example, a user table that stores user information and security information related to the individual users.

In FIG. 7, a modified services table 702 is provided in the database 700 to store records of modified carrier services according to various embodiments. The modified services table 702 of this particular embodiment provides fields to store the record ID, start date, end date, status ID, and description. The record ID identifies the particular carrier, service, and ship from/ship to locations modified. For example, if United Parcel Services (UPS) has modified its three-day ground service from Atlanta, Ga. to Chicago, Ill., the modified services table 702 will include a record with the record ID field storing a value associated with UPS's three-day ground service from Atlanta to Chicago stored in the table 702. The start date represents the date on which the modification will take affect. The end date represents the date on which the modification will no longer be in affect. The status ID identifies the type of modification. The description provides information for the reason for the modification. Thus, in various embodiments of the invention, one or more records in the modified services table 702 are created, edited, or deleted as the result of the interface module 500 modifying one or more carrier services associated with one or more geographical locations.

In addition, a carriers table 703 is provided in the database 700 that stores information (e.g., records) pertaining to the current common carriers available in the multi-carrier shipping system. Ideally a unique key, also known as a primary key, is provided for each common carrier in the preferred embodiment of this table 703. In this particular embodiment of the carriers table 703, the unique key is the Carrier ID field. This ensures that each Carrier ID represents only one carrier. For example, the Carrier ID "CAR999" may represent UPS. This table 703 enables a database manager to easily edit information for a particular common carrier and add a new common carrier to the system.

A services table 704 is also furnished in the database 700 that stores information (e.g., records) pertaining to the services provided by the common carriers. In this case, a primary key (e.g., Service ID) is provided for each service in the preferred embodiment of this table 704. For example, the services table 704 may comprise a record and primary key for three-day delivery, a record and primary key for over-night air, and a record and primary key for priority shipping. Therefore, a database manager can easily create, edit, and delete services provided by the common carriers of the system by modifying records of this table 704.

A local table 705 is also provided that stores information (e.g., records) pertaining to the locations the common carriers ship from and ship to. A record and primary key (e.g., Local ID) are provided for each individual location in the preferred embodiment of this table 705. As previously discussed, the shipping locations may be defined in numerous ways in various embodiments. For example, the shipping locations may be defined by zip code, city, state, region of the country, or country itself.

In addition, a carrier services table 706 is provided in the database 700 to store all the combinations of carriers, services, and ship from/ship to locations that are provided by the multi-carrier shipping system. In addition, in the preferred embodiment, relationships exist between the Carrier ID field and the primary key field of the carriers table 703, the Service ID field and the primary key field of the services table 704, and the FL ID and TL ID fields and the primary key field of the local table 705. This is to ensure that a combination of carrier, service, and ship from/ship to does not exist in the carrier services table 706 without the carrier first being defined in the carriers table 703, the service first being defined in the services table 704, and the ship from location and ship to location being defined in the local table 705.

For example, if UPS ships three-day ground delivery from Atlanta, Ga. to Chicago, Ill., a record will exist in the carrier services table 706 for this combination of carrier, service, and ship from/ship to locations. Thus, the Record ID field in the carrier services table 706 will contain a primary key representing the combination of UPS three-day ground delivery from Atlanta to Chicago. The Carrier ID field will contain the primary key for UPS. The Service ID field will contain the primary key for three-day ground delivery service. The FL ID will contain the primary key for Atlanta, Ga., and the TL ID will contain the primary key for Chicago, Ill. Therefore, a record will exist in the carrier services table 706 for each combination of carrier, service, and ship from/ship to locations.

In addition, the Record ID field of the carrier services table 706 is related to the Record ID field of the modified services table 702. This relationship is based on the Record ID field of the carrier services table 706 being the "parent" of the Record ID field of the modified services table 702 (e.g., "child"). Therefore, a combination of carrier, service, and ship to/ship from locations cannot exist in the modified services table 702 without first being defined in the carrier services table 706. This is to ensure that a particular combination of carrier, service, and ship to/ship from locations exist in the database 600 and is available in the multi-carrier shipping system 100 before the status of the combination can be modified.

A status table 707 is also provided in the database 700 that stores information (e.g., records) pertaining to the different status a particular carrier service can have. For example, the status for a particular carrier can be normal operation, terminated, suspended, delayed, or embargoed in various embodiments of the invention. Therefore, a separate record and primary key exist for each status in the status table 707. In the preferred embodiment, a relationship exists between the Status ID field of the status table 707 and the Status ID field of the modified services table 702. Therefore, a record with a particular status cannot exist in the modified services table 702 without the particular status being first defined in the status table 707. In addition, this table provides the database manager with an easy source to create, edit, and delete status from the multi-carrier shipping system 100.

Thus, for various embodiments that include the database 700 as described above in FIG. 7, the processor 60 via the interface module 500 will query the carrier services table 706 to provide the listing of carrier services to modify, as shown at the top of the GUI in FIG. 6A. In addition, in various embodiments, the processor 60 via the module 500 may query additional information from other tables in the database 700 to display in the listing. For example, the processor 60 may query the current status for each carrier service from the modified services table 602 to also display. On the GUI screen, the user simply clicks on a selection from the listing at the top of the screen and the information for the particular carrier service is displayed on the bottom portion of the screen shown in FIG. 6A. In the alternative, the user may simply use the drop down lists provided on the GUI screen to select a carrier, service, and ship from/ship to locations.

Returning now to FIG. 5, the processor 60 executes the interface module 500 of various embodiments to obtain data indicating a beginning date for which the status for one or more carrier services is to be modified, as shown in Step 502. In one embodiment, the user brings up a calendar screen by clicking a button on the GUI screen, as shown in FIG. 6B, and selects the desired date. In another embodiment, the user simply types the date into the GUI screen. One of ordinary skill in the art can develop the GUI screen in various ways to allow the user to enter the beginning date in light of this disclosure. In addition, the processor 60 in various embodiments executes the interface module 500 to also obtain data indicating an ending date for which the status for the one or more carrier services is to return to its pre-existing state prior to being modified, as shown in Step 503. In various embodiments, this may be accomplished in a similar fashion to the obtaining the beginning date.

In Step 504, the processor 60 executes the interface module 500 of various embodiments to obtain data indicating one or more geographical delivery areas in which the status for one or more carrier services is to be modified. Again, this may be accomplished in numerous ways in various embodiments. For example, the user may select a geographical location from a drop down list provided on the GUI screen. In addition, the geographical location may be defined in numerous ways in various embodiments. For example, the geographical location may be defined in terms of zip code, state, area of the country, or city as shown in the GUI screen of FIGS. 6A-6E.

The particular embodiment of the GUI screen shown in FIGS. 6A-6E displays a "From Location" and a "To Location." The "From Location" represents the location where the package is being shipped from and the "To Location" represents the location where the package is being shipped to. In addition, the drop down lists for these two fields on the GUI screen provide an "ALL" choice. Therefore, a user can select the "ALL" choice and the selected carrier service will be modified for every location associated with the "ALL" choice. The same options are also provided for the carrier drop down list and the service drop down list. This feature enables the processor 60 executing the module 500 to modify one or more carriers, services, and locations at the same time.

For instance, returning to the example of the Katrina disaster, it was stated that all common carriers completely suspended service to the New Orleans area for several months. Thus, the drop down lists in the embodiment of the GUI screen provides the user with an "ALL" choice for the "Selected Carrier," "Selected Service," and "From Location." Therefore, the user can select the "ALL" choice from these three drop down lists and select "New Orleans, La." from the "To Location" drop down list, and simultaneously suspend all shipping services to the New Orleans area for all carriers, as shown in FIG. 6C.

In addition, the processor 60 executes the interface module 500 of various embodiments to obtain data indicating the modification for the one or more carrier services, as shown in Step 505. For example, as shown in FIG. 6D, the user may choose the desired status from a drop down list that includes delayed, embargoed, normal, suspended, and terminated. Other embodiments may provide additional status such as modified or relaxed guarantee.

The user simply clicks on the desired status and the selected status is displayed on the GUI screen, as shown in FIG. 6E (e.g., "Delayed"). Finally, the processor 60 executes various embodiments of the interface module 500 to obtain data indicating a description or reason for the modification. For example, the user may enter the description in a field provided on the GUI Screen as shown in FIG. 6E. In the example, the GUI screen shows that the reason for delayed three-day ground shipping between Atlanta and Chicago is due to flooding caused by spring rain storms in the Reason field.

Once the user has selected the desired dates, geographical areas, and status, for the particular carrier service, the user clicks the save button on the embodiment of the GUI screen shown in FIG. 6E. In response, the processor 60 executing the interface module 500 of various embodiments will modify data indicating the status for the one or more carrier services shown as Step 506 in FIG. 5. For example, the information entered by the user is stored in memory. Thus, returning to FIG. 7 that displays an embodiment of a database 700, the processor 60 stores the information shown on FIG. 6E in the modified services table 702 as a single record. A record is created if the record for the particular combination of carrier service (e.g., carrier, service, from location, and to location) does not already exist in the table. If the record does already exist, it is updated.

Therefore, if a shipper logs onto the multi-carrier system 100 and enters information to ship a package using 3-day ground service from Atlanta to Chicago on March 13, in the provided example, the multi-carrier system 100 will query the interface module 500 as to whether any carrier has modified such service between Atlanta and Chicago for the specified date. In turn, the processor 60 executes the interface module 500 to query the modified services table 702 to determine whether any carrier has modified such service and transmits data indicating the status back to the multi-carrier shipping system 100, shown as Step 507. Thus, in the example, the multi-carrier shipping system 100 would notify the shipper that UPS has indicated that three-day ground service has been delayed for the specified date and therefore UPS cannot guarantee three-day ground service. In other embodiments, the multi-carrier shipping system 100 simply queries the modified services table 702 directly.

Furthermore, the processor 60 executing various embodiments of the interface module 500 will automatically return the status on the ending date to its pre-existing state prior to being modified, shown as Step 508 in FIG. 5. The processor 60 may accomplish this in various embodiments using numerous mechanisms. For example, the interface module 500 may be adapted to routinely check the modified services table 702 to determine whether a modification is no longer in affect. The processor 60 executes the interface module 500 to perform this task to keep the modified services table 702 current, and to reflect the current and correct status of a particular service when a shipper using the multi-carrier shipping system 100 queries the particular service. As a result, the processor 60 executes the interface module 500 to remove the disruption at the end of the date range and the regular services offered for the area are restored.

One way the processor 60 can accomplish this is by running a batch processing feature 708 of the interface module 500 that checks the ending date in the modified services table 702 periodically, as shown in FIG. 7. For example, the batch processing feature 708 may be set up to be executed by the processor 60 to query the modified services table 702 every day at a specified time, such as every morning at six a.m., to see if any of the ending dates for a record in the table 702 have expired. If an ending date for a record has expired, the processor 60 executes the batching feature 708 of various embodiments to simply delete the record from the table 702. However, in other embodiments, the processor 60 may first create a history of the record before deleting the record from the table 702. For example, the processor 60 may store a copy of the record in a data warehouse, flat file, or another database for historical purposes. This will provide a way for a common carrier or the service providing the multi-carrier shipping system 100 to investigate the histories of modifications made to particular services. One of ordinary skill in the art can envision numerous ways to create a history of the record 709 in light of this disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for modifying a first status and a second status for one or more carrier package shipping services based on one or more geographical delivery areas in a multi-carrier package shipping system, said first status associated with a first common carrier and said second status associated with a second common carrier, comprising the steps of:

(1) modifying data stored in at least one storage media and indicating said first status and said second status for said one or more carrier package shipping services, by at least one computer processor, in response to:

(a) obtaining first data indicating a first beginning date for which said first status for said one or more carrier package shipping services is to be modified from a first common carrier system associated with said first common carrier over a communication network;

(b) obtaining second data indicating a first ending date for which said first status for said one or more carrier package shipping services is to return to its pre-existing state prior to being modified from said first common carrier system over said communication network;

(c) obtaining third data indicating said one or more geographical delivery areas in which said first status for said one or more carrier package shipping services is to be modified from said first common carrier system over said communication network;

(d) obtaining fourth data indicating a first modification for said first status for said one or more carrier package shipping services from said first common carrier system over said communication network;

(e) obtaining fifth data indicating a second beginning date for which said second status for said one or more carrier package shipping services is to be modified from a second common carrier system associated with said second common carrier over said communication network;

(f) obtaining sixth data indicating a second ending date for which said second status for said one or more carrier package shipping services is to return to its pre-existing state prior to being modified from said second common carrier system over said communication network;

(g) obtaining seventh data indicating said one or more geographical delivery areas in which said second status for said one or more carrier package shipping services is to be modified from said second common carrier system over said communication network; and (h) obtaining eighth data indicating a second modification for said second status for said one or more carrier package shipping services from said second common carrier system over said communication network; and (2) in response to receiving an inquiry about at least one of said one or more package shipping carrier services from said multi-carrier package shipping system, said inquiry indicating said first common carrier and said second common carrier and a particular geographical delivery area:

(a) querying said modified data stored in said at least one storage media by said at least one computer processor;

(b) in response to (1) said inquiry being received after said first beginning date, (2) said inquiry being received prior to said first ending date, and (3) said particular geographical delivery area being one of said one or more geographical delivery areas indicated in said third data, transmitting said fourth data indicating said first modification of said first status to said multi-carrier package system for publishing to a shipper; and (c) in response to (1) said inquiry being received after said second beginning date, (2) said inquiry being received prior to said second ending date, and (3) said particular geographical delivery area being one of said one or more geographical delivery areas indicated in said seventh data, transmitting said eighth data indicating said second modification of said second status to said multi-carrier package system for publishing to said shipper.

2. The method of claim 1, wherein at least one of said first status and said second status comprise normal, terminated, suspended, delayed, embargoed, or any combination thereof.

3. The method of claim 1, wherein said geographical delivery area is a zip code.

4. The method of claim 1 further comprising the step of modifying data indicating said first status for said one or more carrier package shipping services, by said at least one computer processor, in response to obtaining data indicating a description for why said first status for said one or more carrier package shipping services is to be modified.

5. A system for modifying a first status and a second status for one or more carrier services based on one or more geographical delivery areas in a multi-carrier package shipping system, said first status associated with a first common carrier and said second status associated with a second common carrier, said system comprising:

at least one network in communication with said multi-carrier package shipping system and a plurality of carrier systems for common carriers;

at least one storage media;

a processor in communication with said at least one storage media and said at least one network and configured to execute an interface module to:

(1) modify data stored in said at least one storage media indicating said first status and said second status for one or more carrier package shipping services in response to:

(a) obtaining first data indicating a first beginning date for which said first status for said one or more carrier package shipping services is to be modified;

(b) obtaining second data indicating a first ending date for which said first status for said one or more carrier package shipping services is to return to its pre-existing state prior to being modified;

(c) obtaining third data indicating said one or more geographical delivery areas in which said first status for said one or more carrier package shipping services is to be modified; and (d) obtaining fourth data indicating a first modification for said first status for said one or more carrier package shipping services, wherein said first, second, third, and fourth data are obtained over said at least one network from a first of said plurality of carrier systems, said first carrier system being associated with said first common carrier;

(e) obtaining fifth data indicating a second beginning date for which said second status for said one or more carrier package shipping services is to be modified;

(f) obtaining sixth data indicating a second ending date for which said second status for said one or more carrier package shipping services is to return to its pre-existing state prior to being modified;

(g) obtaining seventh data indicating said one or more geographical delivery areas in which said second status for said one or more carrier package shipping services is to be modified; and (h) obtaining eighth data indicating a second modification for said second status for said one or more carrier package shipping services, wherein said fifth, sixth, seventh, and eighth data are obtained over said at least one network from a second of said plurality of carrier systems, said second carrier system being associated with said second common carrier; and (2) in response to receiving an inquiry about at least one of said one or more carrier package shipping services from said multi-carrier package shipping system, said inquiry indicating said first common carrier and said second common carrier and a particular geographical delivery area:

(a) query said modified data;

(b) in response to (1) said inquiry being received after said first beginning date, (2) said inquiry being received prior to said first ending date, and (3) said particular geographical delivery area being one of said one or more geographical delivery areas indicated in said third data, transmit said fourth data indicating said first modification of said first status to said multi-carrier package system for publishing to a shipper; and (c) in response to (1) said inquiry being received after said second beginning date, (2) said inquiry being received prior to said second ending date, and (3) said particular geographical delivery area being one of said one or more geographical delivery areas indicated in said seventh data, transmit said eighth data indicating said second modification of said second status to said multi-carrier package system for publishing to said shipper.

6. The system of claim 5, wherein at least one of said first status and said second status comprise normal, terminated, suspended, delayed, embargo, or any combination thereof.

7. The system of claim 5, wherein said geographical delivery area is a zip code.

8. The system of claim 5, wherein said processor executes said interface module to modify said data indicating said first status for said one or more carrier package shipping services in response to obtaining data indicating a description for why said first status for said one or more carrier package shipping services is to be modified from said first carrier system.

9. A non-transitory computer-readable medium having a computer program for modifying a first status and a second status for one or more carrier package shipping services based on one or more geographical delivery areas in a multi-carrier package shipping system, said first status associated with a first common carrier and said second status associated with a second common carrier, said computer program being executable by a processor to:
(1) modify data stored in said at least one storage media indicating said first status and said second status for one or more carrier package shipping services in response to:
  (a) obtaining first data indicating a first beginning date for which said first status for said one or more carrier package shipping services is to be modified from a first common carrier system associated with said first common carrier over a communication network;
  (b) obtaining second data indicating a first ending date for which said first status for said one or more carrier package shipping services is to return to its pre-existing state prior to being modified from said first common carrier system over said communication network;
  (c) obtaining third data indicating said one or more geographical delivery areas in which said first status for said one or more carrier package shipping services is to be modified from said first common carrier system over said communication network;
  (d) obtaining fourth data indicating a first modification for said first status for said one or more carrier package shipping services from said first common carrier system over said communication network;
  (e) obtaining fifth data indicating a second beginning date for which said second status for said one or more carrier package shipping services is to be modified from a second common carrier system associated with said second common carrier over said communication network;
  (f) obtaining sixth data indicating a second ending date for which said second status for said one or more carrier package shipping services is to return to its pre-existing state prior to being modified from said second common carrier system over said communication network;
  (g) obtaining seventh data indicating said one or more geographical delivery areas in which said second status for said one or more carrier package shipping services is to be modified from said second common carrier system over said communication network; and
  (h) obtaining eighth data indicating a second modification for said second status for said one or more carrier package shipping services from said second common carrier system over said communication network; and
(2) in response to receiving an inquiry about at least one of said one or more carrier package shipping services from said multi-carrier package shipping system, said inquiry indicating said first common carrier and said second common carrier and a particular geographical delivery area:
  (a) query said modified data stored in said at least one storage media;
  (b) in response to (1) said inquiry being received after said first beginning date, (2) said inquiry being received prior to said first ending date, and (3) said particular geographical delivery area being one of said one or more geographical delivery areas indicated in said third data, transmit said fourth data indicating said first modification of said first status to said multi-carrier package system for publishing to a shipper; and
  (c) in response to (1) said inquiry being received after said second beginning date, (2) said inquiry being received prior to said second ending date, and (3) said particular geographical delivery area being one of said one or more geographical delivery areas indicated in said seventh data, transmit said eighth data indicating said second modification of said second status to said multi-carrier package system for publishing to said shipper.

10. The method of claim 1 further comprising the step of automatically modifying said data indicating said first status for said one or more carrier package shipping services, by said at least one computer processor, to its pre-existing state prior to being modified.

11. The system of claim 5, wherein said processor is further configured to execute said interface module to automatically modify said data indicating said first status for said one or more carrier package shipping services to its pre-existing state prior to being modified.

* * * * *